(12) United States Patent
Koulouh et al.

(10) Patent No.: US 8,770,811 B2
(45) Date of Patent: Jul. 8, 2014

(54) ASSEMBLY FOR A LIGHTING AND/OR SIGNALLING DEVICE OF AN AUTOMOTIVE VEHICLE

(75) Inventors: Hassan Koulouh, Le-Pre-Saint-Gervais (FR); Claudio Chiattelli, Le-Blanc-Mesnil (FR)

(73) Assignee: Valeo Vision, Bobigny (FR)

( * ) Notice: Subject to any disclaimer, the term of this patent is extended or adjusted under 35 U.S.C. 154(b) by 474 days.

(21) Appl. No.: 13/083,783

(22) Filed: Apr. 11, 2011

(65) Prior Publication Data
US 2011/0249464 A1  Oct. 13, 2011

(30) Foreign Application Priority Data

Apr. 12, 2010  (FR) ..................... 10 52737

(51) Int. Cl.
*B60Q 1/076* (2006.01)
(52) U.S. Cl.
USPC .............................. 362/523; 29/592.1; 310/91
(58) Field of Classification Search
USPC ............... 362/523, 526; 29/592.1; 310/91, 49
See application file for complete search history.

(56) References Cited

U.S. PATENT DOCUMENTS

| | | | | |
|---|---|---|---|---|
| 4,437,143 A * | 3/1984 | Hayashi et al. | ................ | 362/272 |
| 4,796,164 A * | 1/1989 | Fukura et al. | ................ | 362/546 |
| 4,869,455 A * | 9/1989 | Weeks | ........................... | 248/674 |
| 5,025,184 A * | 6/1991 | Sekine et al. | ................... | 310/71 |
| 6,623,149 B2 | 9/2003 | Leleve | | |
| 6,637,798 B2 * | 10/2003 | Hoshikawa et al. | ........ | 296/96.17 |
| 7,452,116 B2 | 11/2008 | Natchoo | | |
| 7,572,042 B2 | 8/2009 | Deguchi | | |
| 8,297,142 B2 * | 10/2012 | Kawada et al. | ............ | 74/473.12 |
| 2002/0044451 A1 | 4/2002 | Leleve | | |
| 2005/0237759 A1 | 10/2005 | Natchoo | | |
| 2006/0291231 A1 | 12/2006 | Deguchi | | |
| 2008/0080202 A1 * | 4/2008 | Apfelbeck | ..................... | 362/526 |
| 2011/0103086 A1 * | 5/2011 | Nicolai et al. | ................ | 362/523 |

FOREIGN PATENT DOCUMENTS

| | | |
|---|---|---|
| DE | 102005021704 A1 | 11/2006 |
| EP | 1197387 A1 | 4/2002 |
| EP | 1591313 A1 | 11/2005 |
| FR | 2786143 A1 | 5/2000 |
| FR | 2804744 A1 | 8/2001 |

* cited by examiner

*Primary Examiner* — Anabel Ton
(74) *Attorney, Agent, or Firm* — Jacox, Meckstroth & Jenkins

(57) ABSTRACT

An assembly for a lighting and/or signalling device of an automotive vehicle. The assembly has a bracket or support, in particular made of plastic, comprising a housing, and a motor, in particular a stepping motor, arranged so as to be able to be permanently mounted, directly, in the bracket or support housing.

29 Claims, 2 Drawing Sheets

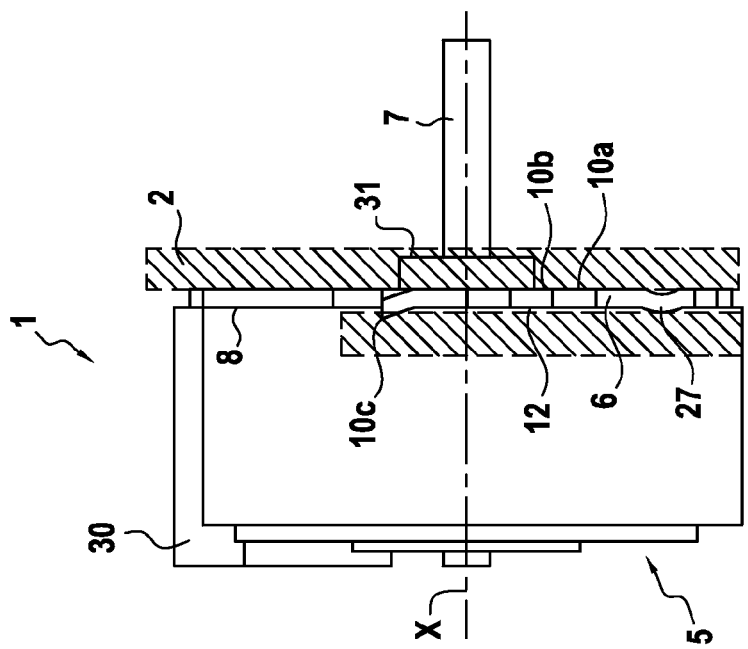
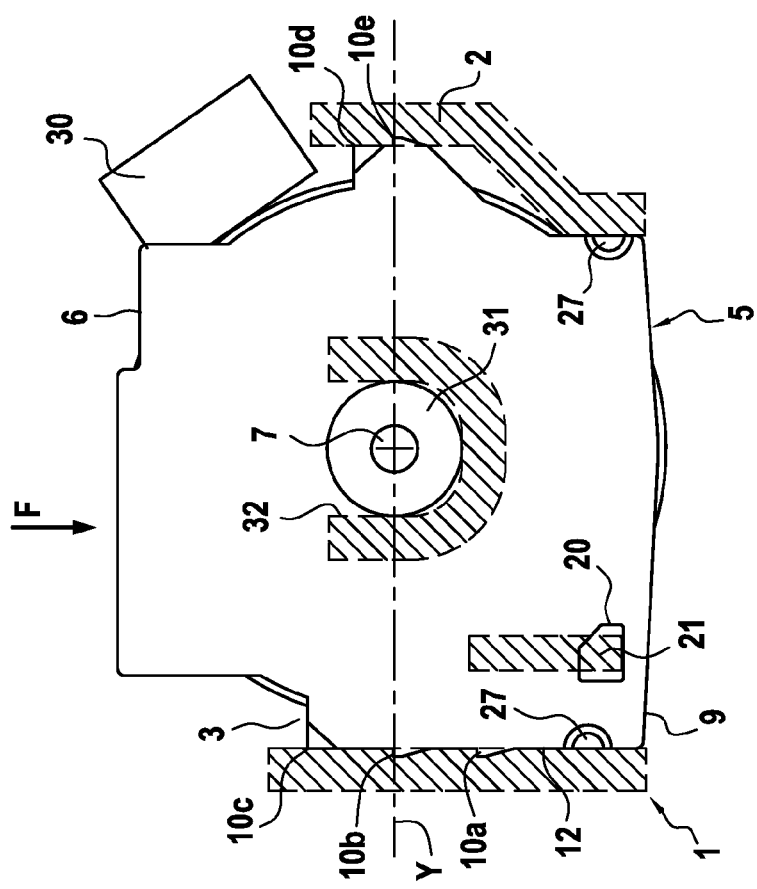

ASSEMBLY FOR A LIGHTING AND/OR SIGNALLING DEVICE OF AN AUTOMOTIVE VEHICLE

CROSS-REFERENCE TO RELATED APPLICATIONS

This application claims priority to French Application No. 1052737 filed Apr. 12, 2010, which application is incorporated herein by reference and made a part hereof.

BACKGROUND OF THE INVENTION

1. Field of the Invention

The invention relates in particular to an assembly for a lighting and/or signalling device of an automotive vehicle.

2. Description of the Related Art

Patent EP 1 591 313 B1, which is equivalent to U.S. Pat. No. 7,452,116, discloses a headlamp device comprising a multifunctional actuator block. Actuator refers to an electrotechnical element, of the motor type, associated with a cinematic chain permitting the movement of a target element. Most often, an actuator comprises an electronic control card designed to manage its operation. The actuator block present in the headlamp device is multifunctional: it makes it possible to perform a first function consisting of the switching of a pivoting flap in the headlamp device, and a second function, called the DBL function.

The field of the invention is in particular that of automotive vehicle headlamps. In this field, different types of headlamp devices are known, essentially including:

parking lights, with low intensity and range;

dipped beams, with greater intensity and range on the road of around 70 meters, which are essentially used at night and whose light beam dispersion is such that it makes it possible not to blind the driver of an oncoming vehicle;

driving main beams, and auxiliary lamps of the long-range type, whose visibility area on the road is around 200 meters, and which must be extinguished when approaching an oncoming vehicle so as not to blind its driver; and fog lamps.

Furthermore, a type of perfected headlamp is known, called a bifunctional headlamp, which combines the dipped beam and main beam functions: to this end, it is for example possible to dispose inside the bifunctional headlamp a rotating cover capable of passing, on command from a first position in which it obscures part of the luminous signal product by the light source of the headlamp, the range of the headlamp being thereby limited to that of the dipped beam so as not to blind other drivers, to a second position in which it does not obscure the luminous signal product by the light source of the headlamp, the range of the headlamp then corresponding to that of the main beam, as described in patent EP 1 197 387, which is equivalent to U.S. Pat. No. 6,623,149. This exemplary embodiment is mainly implemented in headlamp devices of the elliptical type. On the same principle, multifunctional headlamps also exist, in which a mobile cover can adopt more than two positions so as to obscure in a number of ways, selectively, the light beam emitted by the source: there are also bifunctional left-hand-drive-dipping/right-hand-drive-dipping covers, trifunctional left-hand-drive-dipping/right-hand-drive-dipping/main-beam covers etc.

To permit the switching of a beam of a first type to a beam of a second type, in particular in a multifunctional device, it is often desirable to have a stepping motor, which offers precise operation with good angular resolution.

However such a motor has to be integrated into a very hot area, due to the proximity with the light source, while occupying the smallest space for reasons of overall dimension.

Moreover the mounting of the motor in the device must be able to be done relatively simply.

SUMMARY OF THE INVENTION

The invention seeks in particular to respond to the multiple demands referred to above. The present invention relates in particular to multifunctional devices.

One object of the invention is therefore an assembly for a lighting and/or signalling device of an automotive vehicle, this assembly comprising:

a bracket or support, in particular made of plastic, comprising a housing; and a motor, in particular a stepping motor, arranged so as to be able to be permanently mounted, directly, in the bracket or support housing.

Preferably, the motor is permanently mounted in the bracket or support housing without the aid of screws or additional parts, which makes it possible to simplify assembly operations and also to reduce the overall dimension by the absence of additional parts (for example screws).

If so wished, the motor is mounted in the bracket or support housing irreversibly, that is, a movement of the motor in the sense of disengaging it from the housing would damage the housing and/or the motor.

In one exemplary embodiment of the invention, the motor comprises a plate, in particular made of metal, for example made of steel, stainless steel or aluminum, arranged so as to participate in the fixing or fastening of the motor in the housing.

Advantageously the motor comprises a rotating shaft with a longitudinal axis, and the plate extends substantially perpendicularly to this longitudinal axis of the motor.

For example, the plate is disposed on a face of the motor, on the side of the rotating shaft.

Preferably, the motor comprises at least one clamp arranged so as to be able to bite into the material of the bracket or support housing.

The invention thus makes it possible not to depend on the creep of the material, in particular the plastic material of the bracket or support. The motor is as it were mounted rigidly in the housing.

Moreover, this way of operating gives a reduced overall dimension.

In one exemplary embodiment of the invention, the clamp is fitted on the plate of the motor, in particular on an edge of this plate.

The plate can comprise at least two clamps disposed on two opposite sides of this plate, on its edge.

The plate can comprise, on the same side of its edge, at least two neighboring clamps.

In one exemplary embodiment of the invention, the motor, and in particular the plate, comprises at least two clamps, one projecting in a first direction and the other clamp in another direction, in particular a direction perpendicular to the first.

If so wished, the motor comprises at least one ratchet or snap fitting element arranged so as to cooperate with an additional ratchet or complementary snap fitting element on the bracket or support.

For example, the ratchet or snap fitting element on the motor corresponds to an orifice formed on the plate, and the bracket or support comprises at least one ratchet pad or snap fitting leg arranged so as to engage by ratcheting in the orifice of the plate.

In one exemplary embodiment of the invention, the plate is arranged so as to be able to be mounted in two lateral slits of the bracket or support housing.

If appropriate, the plate comprises at least one spacing element arranged so as to permit the spacing of the plate in the housing, in particular in the slits.

The spacing element can comprise a boss formed on one face of the plate.

In one exemplary embodiment of the invention, the plate participates in the mounting of an electrical connector on the motor.

The motor can comprise a collar from which the rotating shaft of the motor projects, and this collar is arranged so as to engage in a passage of the bracket or support, in particular to guide the motor in relation to the bracket or support during mounting.

For example, the motor comprises a rotating shaft coupled with a gear arranged so as to cooperate with a cogwheel for the activation of covers.

Another object of the invention is a motor in particular for an assembly such as defined above, comprising a plate arranged so as to participate in the fixing or fastening of the motor in the housing.

The invention further relates to a lighting and/or signalling device of an automotive vehicle, in particular an automotive vehicle headlamp, comprising an assembly such as defined above.

The device can comprise a plurality of covers for forming different types of light beams, for example a dipped beam, a motorway beam and a main beam, and these covers can be activated by the stepping motor or another type of motor.

Advantageously the assembly with the motor is substantially disposed between a reflector and a lens of the device.

Another object of the invention is a process for the assembling of an assembly such as defined above, comprising the following step:

fixing or fastening the motor in the bracket or support housing, without the aid of screws or additional parts.

BRIEF DESCRIPTION OF THE ACCOMPANYING DRAWINGS

The invention can be better understood on reading the detailed description which will follow, of a non-exhaustive example of embodiment of the invention, and on examining the attached drawing, in which:

FIG. 1 shows, schematically and partially, in front view, an assembly according to one exemplary embodiment of the invention;

FIG. 2 shows, schematically and partially, in side view, the assembly of FIG. 1.

DETAILED DESCRIPTION OF THE PREFERRED EMBODIMENTS

Figure 3:
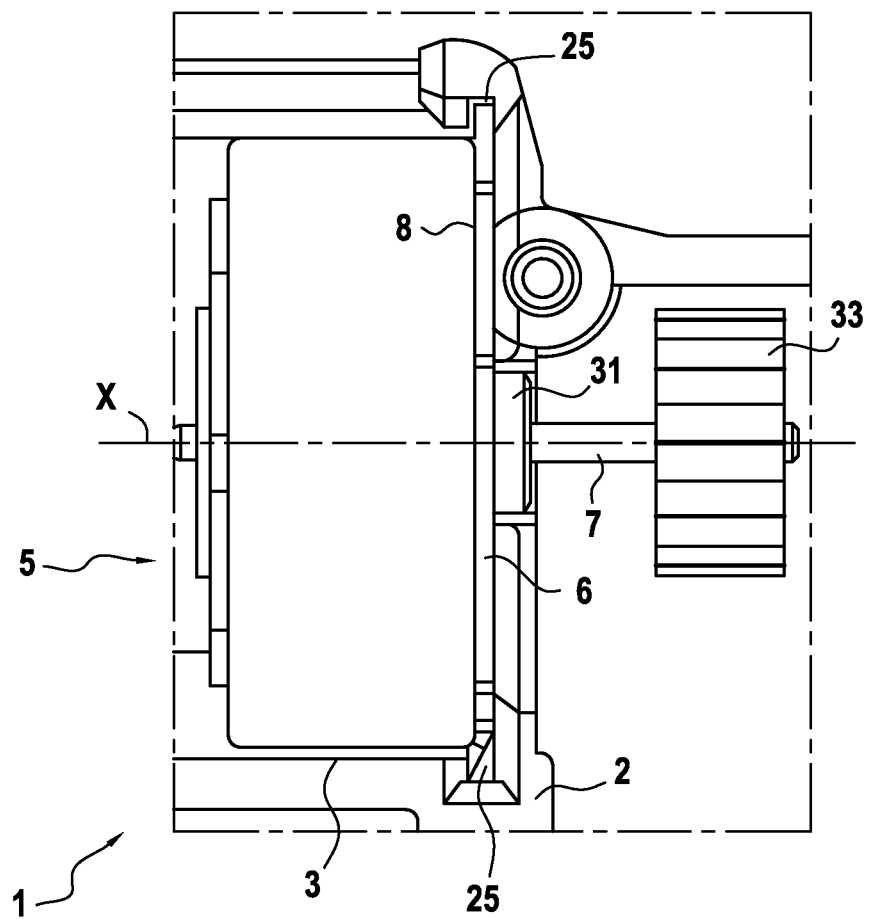
FIG. 3 shows, schematically and partially, in top view, the assembly of FIG. 1.

FIGS. 1 to 3 show an assembly 1 for an automotive vehicle headlamp, this assembly comprising:

a bracket or support 2 made of plastic, for example in thermoplastic, comprising a housing 3, this housing 3 comprising a perforated bottom 9; and a stepping motor, labeled 5, arranged so as to be able to be permanently mounted, directly, in the housing 3 of the bracket or support 2.

This type of stepping motor is capable of generating and reproducing, in the environmental conditions of automobile headlamps, micro-displacements compatible with the precise positioning of the beam cut-offs required, in particular such as to avoid blinding other users.

Stepping motors which are most often of the "two-pole" type, i.e., equipped with two windings driven quadratically by a current, require control electronics.

The motor 5 is permanently mounted in the housing 3 of the bracket or support 2, without the aid of screws or additional parts.

The motor 5 is inserted in this housing 3 following a direction of insertion F, towards the perforated bottom 9.

In the example described, the motor 5 is mounted in the housing 3 of the bracket or support 2 irreversibly, i.e., a movement of the motor 5 in the sense of disengaging it from the housing 3 would damage the housing and/or the motor 5.

The motor 5 comprises a plate 6, in particular made of metal, arranged so as to participate in the fixing or fastening of the motor 5 in the housing 3.

The motor 5 comprises a rotating shaft 7 with a longitudinal axis X, and the plate 6 extends substantially perpendicularly to this longitudinal axis X of the motor.

The plate 6 is disposed on a face 8 of the motor, on the side of the rotating shaft 7.

The motor 5 comprises a plurality of clamps 10a-10e arranged so as to be able to bite into the material of the housing 3 of the bracket or support 2.

These clamps 10a-10e are embodied on the plate 6 of the motor 5.

Certain clamps 10a, 10b and 10e are on an edge 12 of this plate 6.

The plate 6 comprises clamps 10a and 10b on the one hand, and 10e on the other hand, disposed on two opposite sides of this plate 6, on its edge 12.

These clamps 10a and 10b are disposed near to each other, being for example adjacent.

These clamps 10a, 10b and 10e project in a first direction Y and the clamps 10c and 10d project in another direction, namely the direction X perpendicular to the first direction Y.

These clamps are, in the example described, made in one piece with the plate 6.

Of course, the number of clamps and the disposition thereof may be different from what has just been described.

The plate 6 comprises a ratchet or snap fitting element 20 arranged so as to cooperate with an additional ratchet or complementary snap fitting element 21 on the bracket or support.

For example, the ratchet or snap fitting element on the plate corresponds to an orifice 20 formed on the plate 6, and the bracket or support comprises a ratchet pad or snap fitting leg 21 arranged so as to engage by ratcheting in the orifice 20 of the plate.

The plate 6 is arranged so as to be able to be mounted in two lateral slits 25 of the housing 3 of the bracket or support 2, as can be seen in FIG. 3 in particular.

The plate 6 also comprises two spacing elements 27 (projecting following the direction X), on two sides of the plate 6, near to the bottom 9, arranged so as to permit the spacing, following the axis X, of the plate 6 in the slits 25.

The spacing element can comprise a boss 27 formed on a face of the plate 6.

The plate 6 participates in the mounting of an electrical connector 30 on the motor 5. This connector 30 permits in particular the electrical power supply of the motor 5.

The motor 5 comprises a collar 31 from which the rotating shaft 7 of the motor projects, and this collar 31 is arranged so as to engage in a passage 32 of the bracket or support, so as to guide the motor 5 in relation to the bracket or support during mounting.

The rotating shaft 7 is coupled with a gear 33 arranged so as to cooperate with a cogwheel, not shown, for the activation of covers.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. An assembly for a lighting and/or signalling device of an automotive vehicle, said lighting and/or signalling device having a vehicle headlamp, said assembly comprising:
    a bracket or support, said bracket or support being made of a plastic material and comprising a housing; and
    a stepping motor mounted in said bracket or support housing;
    at least one of said housing or said stepping motor comprising at least one fastener for fixing said stepping motor in said housing without the aid of screws;
    said assembly being mounted in the lighting and/or signalling device;
    said stepping motor being energized to cause said lighting and/or signalling device to switch between a beam of a first type and a beam of a second type.

2. The assembly according to claim 1, wherein said at least one fastener comprises a plurality of fasteners for mounting said stepping motor comprises said at least one fastener for engaging said bracket or support housing to fix said stepping motor in said housing without the aid of said screws or additional parts.

3. The assembly according to claim 1, wherein said stepping motor is mounted in said bracket or support housing such that a movement of said stepping motor by disengaging it from said bracket or support housing damages said bracket or support housing and/or said stepping motor.

4. The assembly according to claim 1, wherein said stepping motor comprises a plate made of metal and arranged so as to participate in the fixing or fastening of said stepping motor in said bracket or support housing.

5. The assembly according to claim 4, wherein said stepping motor comprising a rotating shaft with a longitudinal axis, wherein the plate extends substantially perpendicularly to this longitudinal axis (X) of said stepping motor.

6. An assembly for a lighting and/or signalling device of an automotive vehicle, said lighting and/or signalling device having a vehicle headlamp, said assembly comprising:
    a bracket or support comprising a housing; and
    a stepping motor mounted in said bracket or support housing in the lighting and/or signalling device;
    wherein said motor comprises at least one clamp that engages said bracket or support housing and arranged so as to be able to bite into said bracket or support housing to retain said motor in said bracket or support housing;
    said assembly being mounted in the lighting and/or signalling device;
    said stepping motor being energized to cause said lighting and/or signalling device to switch between a beam of a first type and a beam of a second type.

7. The assembly according to claim 6, wherein said at least one clamp is fitted on a plate of said motor.

8. The assembly according to claim 7, wherein said at least one fastener comprises at least two clamps arranged on two opposite sides of a plate;
    wherein said at least two clamps engage said bracket or support housing to retain said motor in said bracket or support housing.

9. An assembly for a lighting and/or signalling device of an automotive vehicle, said lighting and/or signalling device having a vehicle headlamp, said assembly comprising:
    a bracket or support comprising a housing; and
    a stepping motor mounted in said bracket or support housing in the lighting and/or signalling device;
    wherein said stepping motor comprises at least one ratchet or snap fitting element arranged so as to engage with an additional ratchet or complementary snap fitting element on said bracket or support housing;
    said assembly being mounted in the lighting and/or signalling device;
    said stepping motor being energized to cause said lighting and/or signalling device to switch between a beam of a first type and a beam of a second type.

10. The assembly according to claim 9, wherein said ratchet or snap fitting element on the motor corresponds to an orifice formed on the plate, and the bracket or support comprises at least one ratchet pad or snap fitting leg arranged so as to engage by ratcheting in said orifice of the plate.

11. An assembly for a lighting and/or signalling device of an automotive vehicle, said lighting and/or signalling device having a vehicle headlamp, said assembly comprising:
    a bracket or support comprising a housing; and
    a stepping motor mounted in said bracket or support housing in the lighting and/or signalling device;
    wherein the motor comprises a plate arranged so as to participate in the fixing or fastening of the motor in the housing;
    wherein the plate is arranged so as to be able to be mounted in two lateral slits of the bracket or support housing;
    said assembly being mounted in the lighting and/or signalling device;
    said stepping motor being energized to cause said lighting and/or signalling device to switch between a beam of a first type and a beam of a second type.

12. An assembly for a lighting and/or signalling device of an automotive vehicle, said lighting and/or signalling device having a vehicle headlamp, said assembly comprising:
    a bracket or support comprising a housing having slits; and
    a stepping motor mounted in said bracket or support housing in the lighting and/or signalling device;
    wherein the stepping motor comprises a plate and arranged so as to participate in the fixing or fastening of the motor in said bracket or support housing;
    wherein the plate comprises at least one spacing element arranged so as to permit the spacing of the plate in the housing in said slits;
    said assembly being mounted in the lighting and/or signalling device;
    said stepping motor being energized to cause said lighting and/or signalling device to switch between a beam of a first type and a beam of a second type.

13. A motor for an assembly according to claim 1, comprising a plate arranged so as to participate in the fixing or fastening of the motor in the housing.

14. A lighting and/or signalling device of an automotive vehicle headlamp for use in an automotive vehicle, comprising an assembly according to claim 1.

15. A process for assembling an assembly according to claim 1, comprising the following step:

fixing or fastening the motor in the bracket or support housing, without the aid of screws or additional parts.

16. The assembly according to claim 2, wherein the motor is mounted in the bracket or support housing such that a movement of the motor by disengaging it from said bracket or support housing damages said bracket or support housing and/or the motor.

17. The assembly according to claim 2, wherein the motor comprises a plate made of metal, arranged so as to participate in the fixing or fastening of the motor in the housing.

18. The assembly according to claim 2, wherein the motor comprising a rotating shaft with a longitudinal axis, wherein the plate extends substantially perpendicularly to this longitudinal axis (X) of the motor.

19. An automotive vehicle headlamp, comprising an assembly and a lighting and/or signalling device having a vehicle headlamp, said assembly comprising:
- a bracket or support, said bracket or support comprising a housing; and
- a stepping motor mounted in said bracket or support housing;
- at least one of said housing or said stepping motor comprising at least one fastener for fixing said stepping motor in said housing without the aid of screws;
- said assembly being mounted in said automotive vehicle headlamp;
- said stepping motor being energized to cause said lighting and/or signalling device to switch between a beam of a first type and a beam of a second type.

20. The automotive vehicle headlamp according to claim 19, wherein the stepping motor is mounted and retained in the bracket or support housing without the aid of screws or additional parts.

21. The assembly according to claim 7, wherein said at least one clamp is fitted on an edge of said plate of said motor.

22. The assembly according to claim 7, wherein said plate comprises at least two clamps arranged on two opposite sides on the edge of said plate.

23. The assembly according to claim 19, wherein said at least one fastener comprises a plurality of clamps, said motor comprises a plate having said plurality of clamps for engaging said housing when said motor is mounted therein.

24. The assembly according to claim 1 wherein the lighting and/or signalling device comprises a cover, said motor driving said cover to switch a beam of the lighting and/or signalling device.

25. The assembly according to claim 6, wherein said bracket or support is made of plastic and said at least one clamp is metal.

26. The assembly according to claim 11, wherein said bracket or support is made of plastic and said plate is metal.

27. The assembly according to claim 12, wherein said bracket or support is made of plastic and said plate is metal.

28. The automotive vehicle headlamp according to claim 19, wherein said bracket or support is made of plastic and said at least one fastener is metal.

29. The assembly according to claim 1, wherein said stepping motor drives a cover to cause said switching between said beam of a first type and said beam of a second type.

* * * * *